United States Patent [19]

Mueller

[11] 4,153,382

[45] May 8, 1979

[54] CENTER DRILLING MACHINE

[75] Inventor: Helmut Mueller, Kirchheim-Teck, Fed. Rep. of Germany

[73] Assignee: Sprimag Spritzmaschinenbau GmbH, Kirchheim-Teck, Fed. Rep. of Germany

[21] Appl. No.: 817,099

[22] Filed: Jul. 19, 1977

[30] Foreign Application Priority Data

Jul. 19, 1976 [DE] Fed. Rep. of Germany ....... 2632481

[51] Int. Cl.$^{2}$ .............................................. B23B 49/04

[52] U.S. Cl. ......................................... 408/10; 408/41

[58] Field of Search ....................... 408/37, 39, 41, 10, 408/11, 1, 16

[56] References Cited

U.S. PATENT DOCUMENTS

| | | | |
|---|---|---|---|
| 966,816 | 8/1910 | Fischer | 408/39 |
| 1,017,193 | 2/1912 | Whiton | 408/41 |
| 1,469,368 | 10/1923 | Thacher | 408/41 |
| 3,861,817 | 1/1975 | Muller | 408/16 |

*Primary Examiner*—Gil Weidenfeld
*Attorney, Agent, or Firm*—Robert J. Koch

[57] ABSTRACT

Disclosed is an apparatus and machine for center drilling rod or rod-like materials, and a method for simultaneous center drilling of both ends of a rod or rod-like materials by using the disclosed apparatus and machine having a frame supporting a first centering cone mounted stationary to said frame, a second centering cone movably mounted to said frame for movement along an axis extending between said first and second centering cones, an adjustable and movable workpiece rest mounted to said frame for supporting a rod-like member along said axis, first and second center drilling means each movably mounted to said frame and each adjacent to and cooperating with a centering cone for center drilling of the ends of a rod-like member, adjustable sensing means for controlling the extent of center drilling at each end of a rod-like member and means for hydropneumatic movement of said movable centering cone along said axis.

6 Claims, 5 Drawing Figures

9
8
8
9
20
22
23
4
19
5
3
7
7
6
24
1
2

9
11
10
15
14
13
12

18b
17
16
21
24
30
29
28
26
27
25
18a
17
16
21
30
31

CENTER DRILLING MACHINE

BACKGROUND OF THE INVENTION

1. Field of Invention

The invention relates to a centerdrilling machine for rod material comprising a machine bed, two center drilling units, of which one is fixed and the other is adapted to be moved relative thereto. More specifically, the drilling units each comprise a centering cone, adjustable shifting workpiece rests, and a coolant supply system. The movable drilling unit is adapted fro shifting movement by hydropneumatic means operated automatically or manually and in conjunction with the stationary drilling unit.

2. Description of the Prior Art

Center drilling machines having substantial advantages as compared with conventional lathes with center drilling devices are known in the art. In the case of lathes with center drilling devices the conventional arrangement utilizes a drilling tool, mounted in a shifting manner on the lathe bed. The drill may be pressed against the center of the workpiece by a simple lever mechanism to drill the hole into the workpiece. The workpiece itself is held in one of two holding devices of the lathe. In order to carry out center drilling at both ends, the workpiece must be removed from the chuck after the first hole has been drilled, turned around and then firmly mounted again in order to be able to make the second drilled hole in the same fashion as the first operation.

The time consuming nature of center drilling at both ends of a workpiece in a conventional lathe and the substantial expenditure of skill and precision required for the manual labor involved leave a great deal to be desired from the standpoint of economy and efficiency.

Center drilling machines have also been proposed, which carry out center drilling at the two ends simultaneously, the workpiece being positioned in holding chucks. The clamping of the workpiece into the correct position in the chucks require a substantial amount of time and, with every change in the diameter of the workpiece, the holding chucks must be set precisely to ensure that the centering drill is exactly positioned on the center point of the workpiece. Thus, while the drilling may be performed in a single step, a substantial time requirement for any retooling must be permitted. The retooling time is required for any changes of the workpiece lengths, diameters, shapes, etc. Therefore, such center drilling machines are only feasible from an economic standpoint in the case of large scale mass production.

In another type of conventional centering machines, the work material is placed loosely on the workpiece rest, and is centered by sliding in centering cones of spring mounted centering sleeves on shifting of the center drilling units, the centering cones being so slotted that the side adjacent to the workpiece consists of three jaws offset by 120°. The depth of drilling is set by turning a setting nut, which is locked by a lock nut. As a result, clamping of the workpiece is not necessary and there is furthermore, the possibility of drilling the centering holes at the two ends with a precise distance setting. With this center drilling machine, it is possible to easily provide rods of different diameters with center holes. If, however, the length of the rods is changed, substantial time is required for retooling. Usually, retooling will involve at least the removal of a base plate, on which the advance slide of the adjustable center drilling unit is arranged, for coarse adjustment, to shift it and then lock it into position again, following which fine setting and final fixing in position can be carried out. Furthermore, adjustment in the depth of drilling, which must be carried out on both center drilling units manually, is time-consuming and involves the danger of inaccurate adjustment of the setting nuts to different lengths or careless tightening of the lock nuts. As a result, this center drilling machine is also only suitable for large scale mass production runs.

Accordingly, it is an object of the present invention to provide an improved center drilling machine in such a manner that it is possible to center rod materials of differing lengths, differing cross-sections and differing diameters with only very short retooling times.

It is another object of the present invention to drill center holes with various different depths as may be required.

It is yet a further object of the present invention to make possible the automation of center drilling operations. and to carry them out rapidly.

In a preferred embodiment, the center drilling machine of the present invention may be used for jobbing and may also be capable of carrying out final machining after carrying out a simple modification making it reasonable and advantageous to use the machine also in small factories and workshops, where no possibility of mass production exists.

Further objects and advantages of the present invention will become apparent from the brief summary of the invention which follows and the more detailed description of the preferred embodiments and drawings relative thereto.

BRIEF SUMMARY OF THE INVENTION

Accordingly, the present invention relates to an apparatus for center drilling of rod-like materials, comprising a frame supporting a first centering cone mounted in a stationary relationship to the frame, a second centering cone movably mounted to the frame for movement along an axis extending between the two centering cones, an adjustable and movable workpiece rest also mounted on the frame in such a manner that it supports a rod-like member along the axis extending between the first and second centering cones, first and second center drilling means each movably mounted to the frame and each mounted adjacent to, and cooperating with, a centering cone in such a manner that center drilling of the ends of the rod-like member are easily accomplished, adjustable sensing means for controlling the depth or extent of center drilling at each end of the rod-like member, and a means for hydropneumatic movement of the movable centering cone along the axis formed by the stationary and movable cones.

Thus, the machine or apparatus as described employes a center drilling unit which is freely moved and adapted to be pneumatically moved in either direction over the length of the frame so that the centering cones may close tightly around a workpiece of varying lengths. Movable sensing rods are also provided in the present invention and, such rods are connected mechanically with the advancing cylinders of the centering drills, and are arranged parallel to the centering drills. In the centering cones, there is provided a passageway for supply of cooling and/or lubricating medium, and a passageway for the supply of compressed air into the centering cone for cleaning the drilling area by blowing it free of debris.

In the case of a machine of the initially mentioned type, this aim is achieved in that the sliding center drilling unit can be freely moved and is adapted to be shifted in both directions pneumatically over the length of the machine bed, that is has closed, smooth centering cones in which there are shifting sensing rods, which are connected mechanically with the advancing cylinders of the centering drills and are arranged adjacent to them in parallel to them and in the centering cones there is a hole for the supply of a cooling and/or lubricating medium and a hole for the supply of scavenging compressed air into the centering cones.

Due to the unlimited pneumatic shifting of the centering unit, it is possible to use the machine on rod material or rod-like members of any desired length. Advancement of the drilling means can only be carried out after the rod shaped workpiece has been centered between the closed centering cones, and has been clamped, so that further advance is opposed. The sensing rods make it possible to sense the respective distance of the ends of the workpieces with different diameters and owing to the connection with the drill, it is possible to make holes which always have the same depths irrespectively of the diameter. Due to this reason, it is also possible to use the machine on rod material with a triangular, square, hexagonal or other polygonal cross-section. The centering cone after each drilling operation can be freed of drilling turnings or other refuse produced on machining by blowing such debris from the centering cone. There is no possibility of sliding out of position or oblique setting because no refuse remains in the centering cones. Since in the case of a workpiece with a circular cross-section the cone is closed, a coolant is employed in the cavity so that optimum cooling and lubricating conditions are ensured, resulting in an increase in the life of the drills.

Additional advantages are achieved when the centering drills are arranged on extensions. Such an extension provides sufficient room for the arrangement of the sensing rods immediately adjacent to the drill.

In another particularly advantageous form of the invention, sensing rods are provided with ends, which can be pneumatically extended or retracted. As a result, it is possible to increase or reduce, if required, the depth of the centering holes individually with each center drilling unit.

In accordance with a further preferred embodiment of the invention, there is the feature that the outlet orifice of the passageway for the supply of the cooling and/or lubricating material, possibly under pressure, is arranged closer to the center of the centering cone apex and generally is directed towards the center of the cone base. The outlet orifice of the passageway for the supply of compressed air is arranged at the outer edge of the centering cone and is directed towards the centering cone apex. This measure makes possible optimum lubrication, cooling and cleaning of the centering cone and drilling area.

It is advantageous if the passageway for the cleaning of the centering cones with compressed air is connected with the rear chamber of the advancing cylinder of the center drilling unit. In this manner, the exhaust air from the advancing cylinder can be used for cleaning, that is to say, for scavenging from the centering cones.

In accordance with further preferred embodiments of the invention, the centering cones may be arranged so that they can be interchanged and/or so that centering inserts can be placed in the centering cones. This makes it possible on the one hand to tool up with other machining tools and, accordingly, to widen the field of application of the machine, while on the other hand, it is possible to provide for better adaptation to smaller or larger cross-sections.

In accordance with a further preferred embodiment of the invention, the workpiece rests can be so constructed and arranged in a movable manner and controlled in a manner to make possible automatic supply and removal of the rod-like members between the centering cones. Accordingly, the use of the machine in an automatic production line without manual operation is made possible.

There is also the possibility of arranging two or more center drilling unit pairs with different machining tools in a parallel manner in a single row. As a result, it is possible to undertake different sequentially performed final machining operations on workpieces without any time being lost for retooling.

By the use of a fully automated machine, it is possible to produce a substantial reduction in machining times per workpiece unit. It also becomes possible to use the machine for jobbing, that is to say, use on workpieces which are not identical. Furthermore, since no setting and retooling is required, the machine can also be operated by unskilled labor.

The invention will now be described with reference to a preferred embodiment and with reference to the accompanying drawings. Throughout the following, and in all parts of this disclosure, the words machine and apparatus are used interchangeably and no limiting interpretation should be given to the particular choice of terms in any instance.

DETAILED DESCRIPTION OF THE INVENTION

Figure 1:
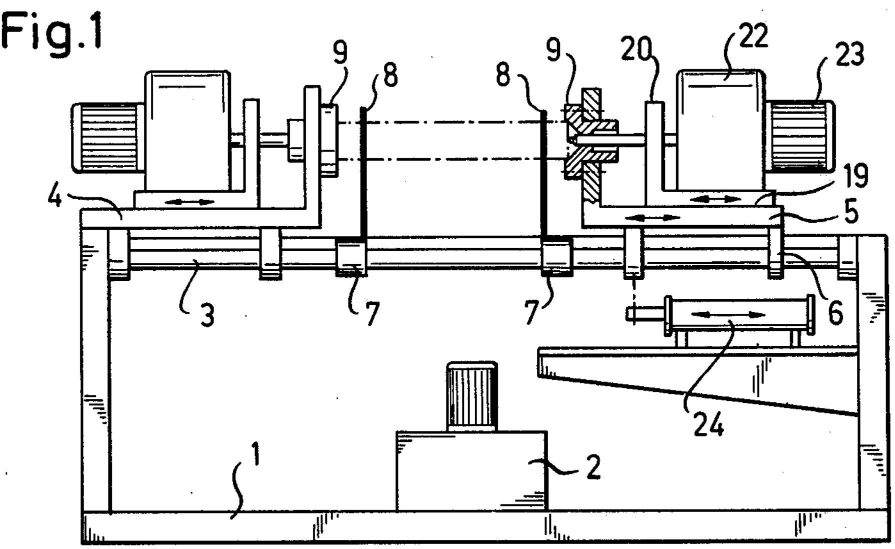
FIG. 1 shows a side view of a center drilling machine in accordance with the invention.

As demonstrated in FIG. 1, a center drilling machine comprises a lower base frame 1 made of solid square material. In the lower part of the lower base frame 1, there is a lubricant and coolant container 2 and a pump (not illustrated). In the upper part of the lower base frame 1, there are slides 3 of hardened and ground round steel. Under the slides 3, there is a trough (not illustrated) for catching turnings and coolant and lubricant, and from which the coolant and lubricant after filtration and possibly after cooling is returned to the coolant container 2.

At one end of the slides 3, there is a machine sled 4 and at the other end, a machine sled 5 is mounted in a movable fashion. The movable machine sled 5 is carried on the slides 3 by means of ball train bush guides (not illustrated). Furthermore, at least two carriages 7 are mounted on the slides 3 between the machine sleds 4, 5. The carriages 7 are provided with interchangable and/or adjustable prismatic workpiece rests 8. The carriages 7 can also be provided with ball train bush guides.

Figure 2:
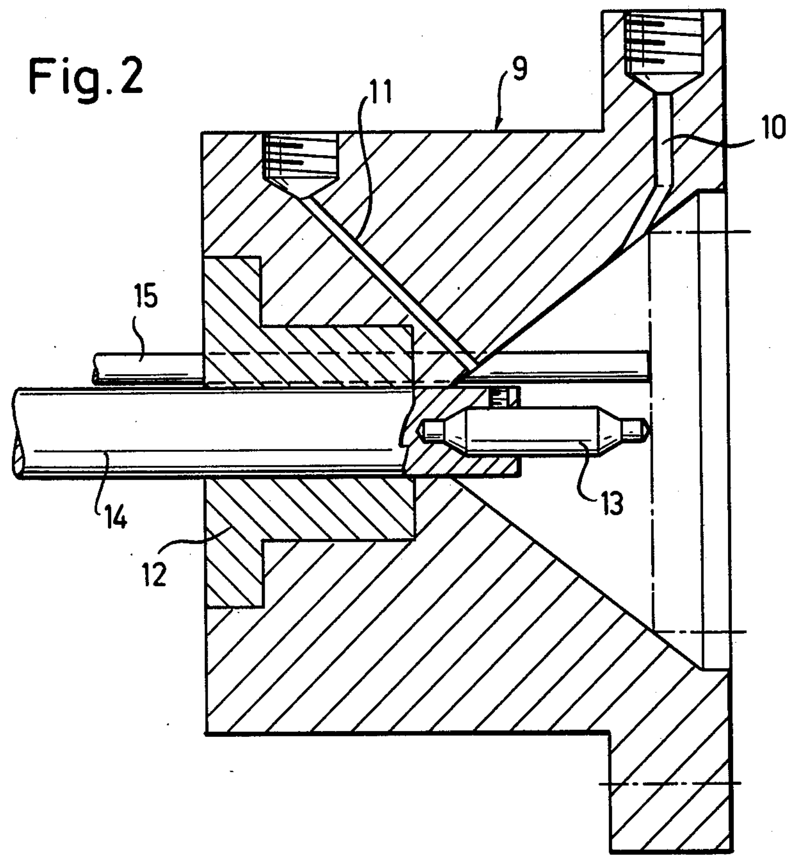
FIG. 2 shows a cross-section taken through a centering cone.

In the two machine sleds 4, 5, there are precisely aligned holes, in which identical closed centering cones 9 are mounted with their openings adjacent to each other. In FIG. 2 representative hardened and ground centering cones 9 are illustrated. In each centering cone 9, two passageways 10, 11 are provided. The passageway 10 serves for the supply of compressed air for scavenging, that is to say, cleaning the centering cone 9 and it has an orifice directed towards the centering cone apex and which lies at the edge of the cone. On the other hand, the orifice of the passageway 11 for the supply of a coolant and lubricant is arranged adjacent to the cone apex and is directed towards the center of the centering cone base. In the central axis of the centering cone 9, a bushing 12 is mounted in the cone 9 at the rear and in the central axis of the bushing 12, a rotatable and shifting extension 14 is arranged carrying a centering drill 13. In the centering cone 9, there is a passage opening for the extension 14. Furthermore, in the bushing 12 and in the extension also in the centering cone 9, there is a passage opening for a sensing rod 15 which can be caused to protrude.

Figure 3:
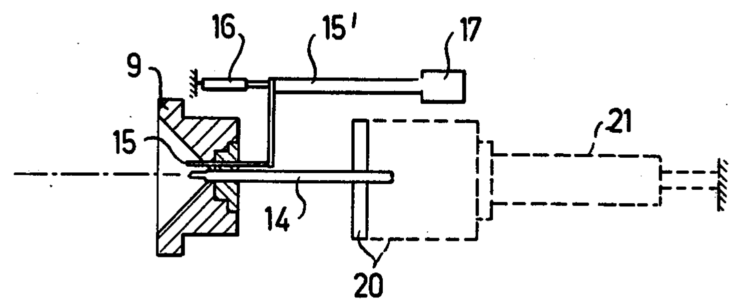
FIG. 3 shows diagrammatically a sensing means.
Figure 4:
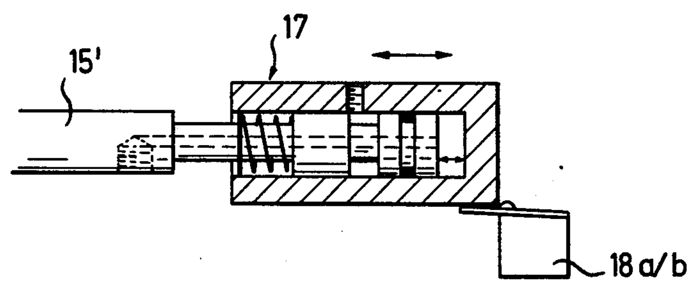
FIG. 4 shows the freely extensible end of the sensing rod.

The sensing rod 15 is arranged behind the bushing 12 in a parallel offset manner in order to allow sufficient room for the advance of the drilling unit. The advancing and retracting movements of the sensing rod 15 are carried out by means of a pneumatic cylinder 16. This is demonstrated in FIG. 3 wherein the part 15', which is arranged with parallel offset of the sensing rod 15 is arranged to be extended and shortened pneumatically as demonstrated in FIG. 4 at the free end 17. The end 17 of the sensing rod cooperates with a limit switch **18*a* or 18*b*** respectively as demonstrated in FIG. 4.

At the basis end of the centering cone 9, suitable guide means and holding means (not illustrated) are provided for receiving centering inserts for workpieces with larger or smaller diameters. Such inserts comprise suitable holes and passageways for the passage of the centering drill and the extension and of the sensing rod, and also for the passage of the coolant and lubricant and the compressed air. The centering cones can, however, also be arranged to be exchanged as a whole for other centering cones with different cone dimensions.

On the machine sleds 4, 5, there are guides 19 on which an angular support 20 can be moved to and fro by hydropneumatic cylinders 21. Furthermore, a steplessly adjustable transmission 22 (for example with a transmission ratio variation ratio of 1 to 10 to allow speeds of 400 to 4000 rpm) is arranged on the angular support 20 together with the motor 23 for the drilling drive. The rotatable shifting extension 14 passes through an opening in the angular support 20, and if necessary, it can be guided in the opening. It is connected with the output shaft of the transmission 22. On the angular support 20, there is additionally the pneumatic limit switch **18*a* or 18*b* respectively, which is operated by the end 17 of the sensing rod 15. The moving machine sled 5 with the angular support 20 can be shifted by a cylinder 24** in both directions.

Figure 5:
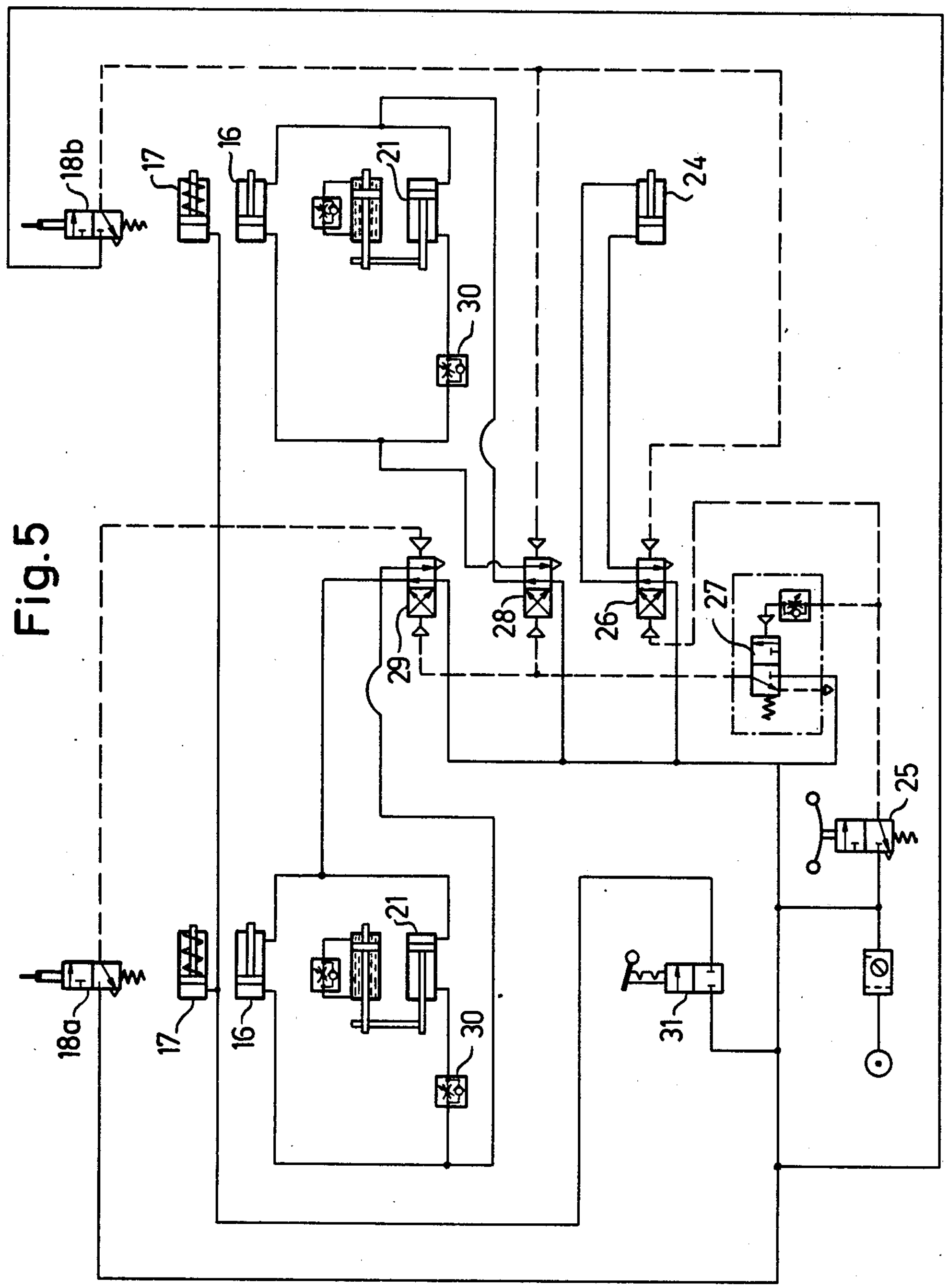
FIG. 5 shows the circuit diagram of the center drilling machine.

In operation, the center drilling machine performs the following steps and operations. Reference is made to the diagram in FIG. 5 for the machine operation and control features. Firstly, the coolant pump and the drive for the centering drill are started. Following this, a workpiece to be processed is mounted manually or automatically using a conveyor on the prismatic workpiece rests 8. The arrangement of the workpiece rests 8 ensures a rough alignment with respect to the direction of centering cones 9. By means of a two-handled lever 25, the advance of the moving machine sled 5 is brought about by supplying compressed air via an air actuated valve 26 to the pneumatic cylinder 24 so that the machine sled 5 is moved towards the fixed machine sled 4. On advance of the machine sled 5 the workpiece is engaged by the two centering cones 9 of the machine sleds 4 and 5 and is centered and clamped at its ends. The delay valve 27, simultaneously supplied with compressed air, ensures that after completion of clamping the compressed air actuates the cylinder 16 and 21 via the valve 28 and 29. As a result, the sensing rods 15 are advanced until they abut against the end faces of the workpiece at an earlier or later point in time in accordance with the particular diameter of the workpiece and the shape of the cone. Simultaneously, the angular support 20 is advanced with the drilling unit towards the end of the workpiece and finally drilling of the center holes takes place. The sensing rods 15 reach the end faces of the workpiece before the drill tips. The advance of the angular support 20 with the drilling unit is continued until the limit switches **18*a* and 18*b* come into engagement with the ends 17 of the sensing rods 15 which operate the switches so that retraction of the sensing rods 15 and of the angular support 20, provided with the drilling units by means of their respective cylinder 16 and 21** takes place back into the starting position.

The advance of the centering drill 13 is so regulated via the choke valves 30 that the centering hole at the end adjacent to the fixed machine sled is finished somewhat before that at the other end so that the limit switches **18*a* and b are operated one after the other as well. Operation of the limit switch 18*b* simultaneously brings about the return of the shifting machine sled 5 by means of a cylinder 24 into the starting position so that the centered workpiece drops onto the workpiece rests 8** and can be removed manually or automatically for moving it into a further machining station.

In the case of center drilling of workpieces with a round or approximately round, that is to say, polygonal cross-section, the centering cones 9 are shut off by the workpiece ends so that the centering cones 9 are filled with the coolant and lubricant, which if required may be supplied under pressure, in which case the cones will also be pressurized to ensure optimum cooling and lubricating conditions. This leads to a substantial prolongation of the lives of the drills used.

By operating a switch 31, the ends 17 of the sensing rods 15 can be pneumatically moved outwards or inwards, that is to say shortened or lengthened as may be desired. On shortening the advance travel of the drill required before the limit switches actuated, will be longer and this means that the hole drilled will be deeper. In the case of extension, the limit switch will be actuated somewhat earlier so that the hole drilled will not be so deep. There is also the possibility of drilling holes with different depths or even different diameters at the two ends and for this purpose, it is only necessary to change the respective length of the sensing rods and, respectively, the drill must be changed in order to correspond to the extension. This may be advantageous if workpieces with different end diameters are to be centered, something which is readily possible in the center drilling machine of the invention owing to automatic center drilling without additional measures.

If the workpieces are to be subjected to several final machining operations, it is advantageous to arrange two or more center drilling units parallel to each other and to supply the workpieces on a conveyor to them one after the other. Such a conveyor can, if required, also comprise the workpiece rests. In this case, the workpieces in any desired order can be provided with plain holes or threaded holes to be reamed to fit or subjected to other necessary machining operations.

The center drilling machine described is equipped with pneumatically operated piston cylinder units. It is however, also possible to use any other desired drive means as for example hydraulic, electric or the like drive means. Similarly, rod-like materials are specified throughout the description and the following claims, but it is also within the concept of the present invention to employ workpieces which are not technically rod-like in nature, but which require center drilling to opposite sides or ends.

What is claimed is:

1. An apparatus for center drilling of rod-like materials comprising:

a frame supporting a first centering cone mounted stationary to said frame, a second centering cone movably mounted to said frame for movement along an axis extending between said first and second centering cones, an adjustable and movable workpiece rest mounted to said frame for supporting a rod-like member along said axis, first and second center drilling means each movably mounted to said frame and each adjacent to and cooperating with one of said centering cones for center drilling of the ends of a rod-like member, adjustable sensing means for controlling the extent of center drilling at each end of the rod-like member and means for movement of said movable centering cone along said axis.

2. The apparatus of claim 1, wherein passageways are provided in said centering cones for supply of cooling and lubricating medium to the area of drilling and for the supply of compressed air to the area of drilling.

3. The apparatus of claim 2, wherein an outlet orifice of said passageway for the supply of the cooling and lubricating medium is arranged closer to the center of the apex of said centering cone and is directed towards the center of the centering cone base and an outlet orifice of said passageway for the supply of compressed air is arranged at the outer edge of the centering cone and is directed towards the centering cone apex.

4. The apparatus of claim 2, wherein said sensing means comprises sensing rods connected with advancing cylinders and cooperating with said centering cones such that drilling is continued until each of said sensing rods contacts a switch member.

5. The apparatus of claim 4, wherein said sensing rods have pneumatically adjustable ends.

6. The apparatus of claim 2, wherein each of said center drilling means comprises a centering drill arranged on an extension mounted and driven by a drill motor in fixed relationship to centering cone.

* * * * *